May 6, 1969 R. L. FORWARD ET AL 3,442,566
COLOR HOLOGRAPHY
Filed March 10, 1966
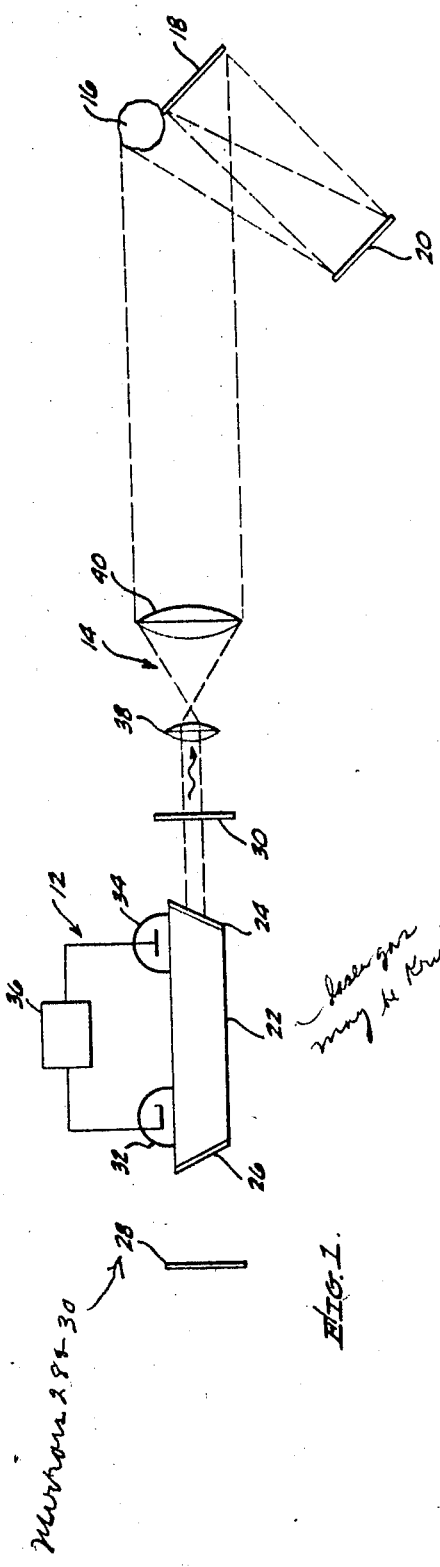
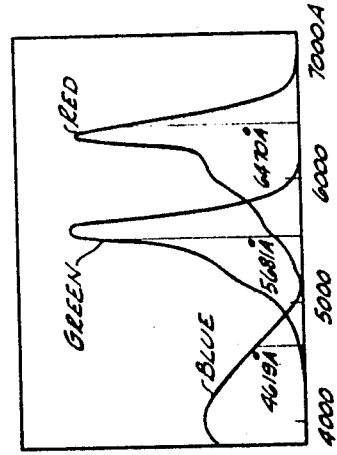
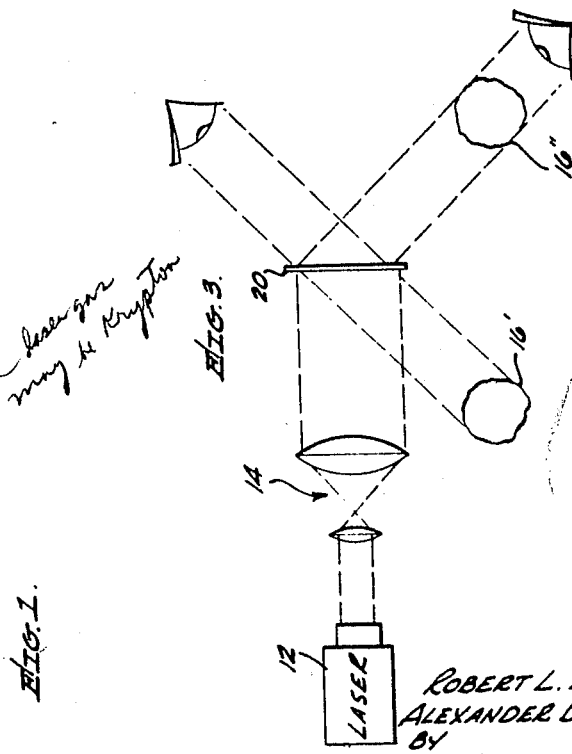
INVENTORS.
ROBERT L. FORWARD,
ALEXANDER D. JACOBSON,
BY
Robert Thompson
ATTORNEY.

United States Patent Office 3,442,566
Patented May 6, 1969

3,442,566
COLOR HOLOGRAPHY
Robert L. Forward, Oxnard, and Alexander D. Jacobson, Sherman Oaks, Calif., assignors to Hughes Aircraft Company, Culver City, Calif., a corporation of Delaware
Filed Mar. 10, 1966, Ser. No. 533,357
Int. Cl. G02b 27/22
U.S. Cl. 350—3.5                 2 Claims

ABSTRACT OF THE DISCLOSURE

This is a color holographic system featured by a laser that simultaneously emits spatially coherent light of three different colors in a single beam. A portion of this beam of coherent light is reflected from a solid object to a color film as an object beam. Another portion of the beam is reflected from a mirror to the color film as a reference beam. These two reflected beams are recorded on color film as a separate interference fringe pattern for each color with all the colors of the separate interference fringe patterns being centered in the more sensitive spectral response portions of the color film. Consequently when a similar laser beam is directed through the developed color film to reconstruct an image of the object, a high degree of color correlation with the photographed object exists.

---

This invention relates generally to holography, and particularly to an improved means and method for recording the full-color, three-dimensional information of an object by means of holography, using a laser source.

In holography, which is the art of recording wave fronts of radiation, experiments have been conducted in recording the three-dimensional aspects of an object by using a laser beam as the illuminating light source. In practice, one portion of the laser beam illuminated the object and was reflected to a high resolution photographic film as an object beam. A second portion of the laser beam, which did not illuminate the object, was reflected directly from a mirror in the vicinity of the object to the photographic film as a reference beam. The object beam and the reference beam were jointly recorded on the photographic film as an interference fringe pattern.

To reproduce an image of the object, it was necessary to illuminate the developed film with a laser beam, whereupon, a monochromatic real image and a monochromatic virtual image were reconstructed in space off of the beam axis. Since the reproduced image was derived from both the phase information and the intensity information recorded on the film, the image exhibited observable three-dimensional characteristics such as: parallax, visual depth, and perspective.

An object of this invention is to provide an improved means and method for recording the three-dimensional characteristics of an object in full color.

Another object of this invention is to provide an improved means and method for making and reproducing full-color holograms.

Other objectives, features, and advantages can be attained by providing a holographic system featured by a laser that is adjusted to simultaneously emit light of different colors, such as red, blue, and green, in a single beam wherein the light associated with each color is spatially coherent. The beam of coherent light is directed so that a portion of the beam illuminates an object and is reflected therefrom to form an object beam, and a portion of the beam is reflected directly from a mirror to form a reference beam. The object beam and the reference beam simultaneously create separate interference fringe patterns for each of the three main colors. A color film is positioned to receive the object beam and the reference beam and records the interference fringe patterns. The color film can be of a type having three layers of photosensitive material, one on top of the other, in which each layer is sensitive to a different one of the three major portions of the color spectrum, i.e. red, green, and blue. Ideally, the peak spectral response of the three layers should be centered with the colors of the coherent light beam. Consequently, there will be substantial independence between the three images formed on the three layers when the dyes in the film are developed. In addition, the phase information and intensity information associated with each of the three colors are recorded on the film such that upon reconstruction the three images, one for each color, are in register.

When a three-color laser beam is directed through the developed film, a real image and a virtual image having a high degree of color correlation with the original object, are focused in space.

Other objects, features, and advantages of this invention will become apparent upon reading the following detailed description of an embodiment and referring to the accompanying drawings, in which:

FIG. 1 is a schematic illustration of a holographic device featured by a laser which generates a multicolor, spatially-coherent beam of light used in taking a color hologram of a solid three-dimensional object;

FIG. 2 is a graph representative of the spectral responses of color film used for making color holograms; and FIG. 3 is a device for reconstructing color images of the object from the information recorded on the hologram by means of a multicolor, spatially-coherent beam of light.

Referring now to the drawings, in FIG. 1 there is illustrated a holographic system featured by a laser 12 which projects a beam of multicolor, spatially-coherent light through a telescope 14 toward an object 16 and a mirror 18. Coherent light reflected from the object 16, hereinafter also referred to as an object beam, contains phase information and intensity information in accordance with the physical characteristics of the surface of the object. The portion of spatially-coherent light reflected from the mirror 18, hereinafter also referred to as a reference beam, is coherent, color by color, with respect to the light in the object beam. The object beam and the reference beam are directed to a color-sensitive film 20 wherein they are simultaneously recorded as three separate interference fringe patterns.

Considering the structure and the operation of the holographic system illustrated in FIG. 1 in more detail, the laser 12 is a gas discharge laser and includes a discharge chamber 22 having a pair of optical transparent Brewster-type windows 24 and 26 disposed across either end. Sealed within the chamber 22 is a noble gaseous lasing material, such as krypton. The discharge chamber 22 is disposed within an optical-frequency, resonant cavity, illustrated generally by a dielectric-coated mirror 28, which may or may not be substantially nontransmissive, and by a partially transmissive dielectric-coated mirror 30, through which spatially-coherent light energy generated by the laser action (represented by an arrow) is directed. A cathode 32 and an anode 34 are mounted in communication with the discharge chamber 22 and have a pump energy source 36 coupled thereacross.

In operation, the pump energy source 36 produces energy sufficient to pump the lasing material to its singly ionized state, whereby radiative transition occurs in this region and produces electromagnetic energy in the visible color spectrum. The pump energy necessary to achieve the transition in any of the ionized states varies with the particular element used as a lasing material, but will always be of a value above a first ionization potential of the gaseous lasing material.

The above described laser can be of the type discussed in: Applied Optics, vol. 4, p. 573, May 1965, entitled, "Visible and Unvisible Laser Oscillations at 118 Wavelengths in Ionized Neon, Argon, Krypton, Xenon, Oxygen, and Other Gases," by W. B. Bridges and A. N. Chester; and Proceedings of the IEEE, vol. 52, No. 7, July 1968, entitled, "Laser Action in Singly Ionized Krypton and Xenon."

The particular wavelengths of spatially-coherent light desired from the laser 12 can be selected by preparing the mirrors 28 and 30 to be highly reflective only at the desired wavelength. In this way, oscillations at the other wavelengths will be suppressed.

The beam of multicolor, spatially-coherent radiation is directed through the simple telescope 14 which enlarges the beam diameter. The telescope 14 includes a positive lens 38 which focuses the beam and a positive lens 40 which recollimates the beam at the larger diameter and directs it along an optical axis toward the object 16 and mirror 18.

The object 16 and mirror 18 occupy sufficient volume in space so that they are both illuminated by separate portions of the spatially-coherent, multicolor beam. The illuminated object 16 can be a solid, three-dimensional object which imparts both phase information and intensity information, in accordance with the physical characteristics of the reflecting surface, to the object beam, and which reflects the object beam toward the color film 20. The mirror 18 is an optically flat, first surface mirror which does not significantly distort the phase fronts of the reference beam. Since that portion of the spatially-coherent light that illuminates the mirror 18 is part of the same beam that illuminates the object 16, the reference beam reflected from the mirror will be coherent, color by color, with the object beam and therefore will contain the phase reference information for the several colors that comprise the object beam. Since, as previously stated, the three colors are simultaneously emitted by the same laser, then, the three color components used in the color hologram process are already aligned and do not require any further optical alignment. A portion of the object beam and the reference beam are directed onto the color-sensitive film 20, where they form interference fringe patterns, one for each color.

The color film 20 is exposed by the interference fringe patterns, thereby recording both intensity and phase information for the various colors for the object 16. A color film that can be used is Type 5385 color print film, manufactured by the Eastman Kodak Co. and described in their brochure MPS-N-1A-CH. This type of film has three layers of photosensitive material, one on top of the other, in which each layer is sensitive to a different one of three separate bands or portions of the color spectrum, i.e., blue, green, and red. Ideally, the peak spectral responses of the three layers should be centered at, or at least near the colors of interest in the beam of spatially-coherent light insofar as possible. For example, with krypton as the lasing material, a strong blue line appears at 4619 A., a strong green light at 5681 A., and a strong red line at 6470 A., as indicated in FIG. 2. Although these colors are not centered with the peak spectral responses of the above-referenced color film, as represented by the three spectral response curves, the colors are in the more sensitive regions of the color spectrum. It should of course be understood that red, green and blue are not the only three colors that could be used, but that other separated bands or portions of the color spectrum could be used instead. In addition, color films having other color-sensitivity curves could possibly be used.

The color film 20 can then be developed and processed in a conventional manner to permanently record the multicolor interference fringe patterns created on it. Thereafter, an image of the three dimensional object can be reconstructed.

To reconstruct an image of the object 16, a beam of multicolor, spatially-coherent light from the laser 12 is directed through the telescope 14 which enlarges the diameter and collimates the beam, and then through the developed color film or hologram 20.

The light of each color interacts with the fringe pattern in the corresponding layer of the color film and with that fringe pattern only. It is an advantage of color film that the detail in the other two layers is transparent to the light of the third color. By inhibiting the interaction between light of one color and a fringe pattern formed from light of another color, spurious images that might otherwise have been created are suppressed. As a result, on passing the multicolor reconstruction beam through the color film hologram, only three virtual and three real images are formed in the off-axis image positions. Moreover, because during the taking process, the light of the three colors is optically aligned, then on playback, the three virtual images are in register, as are the three real images. Consequently, the multicolor laser beam operates on the interference fringe pattern to reconstruct a single, full-color virtual image 16' and a single, full-color real image 16" in space off the optical axis.

To observe the virtual image, it is necessary for an observer to position his eye in space and to look through the hologram at a proper angle to see the reconstructed virtual image behind the hologram 20. To observe the real image, the observer must look toward the hologram at a proper range of angle to see the image reconstructed in space.

In addition to featuring true color, the reconstructed images exhibit certain observable characteristics such as: parallax between near and far elements of the image which are exactly that parallax which occurs when viewing the original object; perspective change in the image as the observer's eye is repositioned in space when looking toward the hologram 20 at various angles; and visual depth, which requires an observer to refocus his eye when shifting his observation from a near portion of the image to a more distant portion.

While salient features have been illustrated and described with respect to a particular embodiment, it should be readily apparent that modifications can be made within the spirit and scope of the invention, and it is therefore not desired to limit the invention to the exact details shown and described.

What is claimed is:

1. An improved method for making color holograms of an object comprising the steps of: generating a beam of spatially coherent light having peaks of intensity at three different and significantly separated wavelengths within the visible spectrum; directing a first portion of said beam to illuminate the object; directing a second portion of said beam to intersect said first portion of the beam coming from the object so as to function as a reference beam; providing a recording medium having three separate photographic emulsions, each photosensitive to a different one of said wavelengths and nonsensitive to the other wavelengths so that the spectral response of the light generated and the recording medium are matched; and recording on the recording medium the interference patterns formed by said first and second portions of said beam at the location where said portions of said beam intersect, whereby separate interference patterns are recorded for each of said different wavelengths so as to reduce cross-talk among the wavelengths upon reconstruction.

2. The method of claim 1 in which the three wavelengths are selected one each from the red, green and blue portions of the visible spectrum.

References Cited

Bell Labs Record, vol. 43, No. 10, p. 416, November 1965.

Mandel, Journal of the Optical Soc. of America, vol. 55, No. 12, December 1965, pp. 1697–1698.

DAVID SCHONBERG, *Primary Examiner.*

R. J. STERN, *Assistant Examiner.*